United States Patent Office 2,861,988
Patented Nov. 25, 1958

2,861,988
CAPROLACTAM MANUFACTURE

Richard Jay England, Woodbury, N. J., assignor to E. I. du Pont de Nemours and Company, Wilmington, Del., a corporation of Delaware No Drawing. Application June 29, 1955
Serial No. 518,937

3 Claims. (Cl. 260—239.3)

The present invention relates to the manufacture of caprolactam. More particularly, this invention relates to an improved process for preparing polymer-grade caprolactam from crude caprolactam.

Caprolactam is used commercially in the manufacture of 6-nylon, a film- and fiber-forming linear polymer. To produce a satisfactory end product, the caprolactam must be of high purity, particularly with respect to the essentially complete absence of color-forming impurities. A number of methods for preparing caprolactam are known, but the product produced in each case requires further treatment before the desired purity is obtained. Generally, the caprolactam is prepared by rearranging cyclohexanone oxime in a concentrated sulfuric acid medium, the medium is neutralized, for example by ammonia, and a water-wet caprolactam is separated from the aqueous solution of the inorganic salts. The water-wet caprolactam is then separated from the water in a crude still. In a variation on this process, a chlorinated hydrocarbon may be used in the rearrangement medium, so that the crude product is obtained in solution in the hydrocarbon solvent, and the crude still is used to separate the caprolactam from the solvent and water of reaction. In either case, the crude caprolactam thus recovered requires further purification before it can be considered "polymer-grade" caprolactam.

Efforts to obtain high-quality caprolactam by fractional distillation of the crude caprolactam have been unsuccessful because some color-forming impurities are found in even the heart cut. Therefore, the practice of crystallizing the caprolactam from a solvent prior to the finishing distillation has gained wide acceptance. The preferred solvents are those which have a relatively low solubilizing power for caprolactam at or near room temperature, but have a considerably higher solubilizing power when heated 30 to 40 degrees above room temperature. The mixed isomers of heptane and perchlorethylene are particularly suitable, although other solvents such as cyclohexane and various petroleum cuts can be used. The crystallized caprolactam obtained by preparing a substantially saturated solution of the crude caprolactam in fresh heated solvent and then cooling is free of color-forming impurities and can be obtained as "polymer-grade" caprolactam from the finishing still.

The solvent from which the caprolactam was crystallized will contain the color-forming impurities and from 1.5 to 15% by weight of caprolactam, depending upon the solvent and the amount of cooling. Removal of the solvent by distillation leaves a residue of contaminated caprolactam which is totally unsuitable for the finishing still. Recycle of the contaminated caprolactam with the crude caprolactam caused a build-up of the contaminants in the purification system and, consequently, a reduction in the quality of the caprolactam from the finishing still. Special treatment of collected residues to recover the caprolactam is very expensive, time-consuming, and requires increased investment in equipment. On the other hand, the amount of caprolactam involved is sufficient to make discard impractical. Therefore, the special treatment of the collected residues has been generally adopted. Even after special treatment, however, the yield loss is quite high.

In addition, in a batch operation, the crystallizer and the cooling coils are invariably coated with crystallized caprolactam after the crystallization step, and mechanical removal has been widely used as the most economical means for removing the deposited caprolactam. Such procedure is also time consuming and costly.

Accordingly, an object of the present invention is to provide a process for the purification of crude caprolactam whereby yield loss is reduced. A further object is to provide a process for the purification of caprolactam whereby the recovery of caprolactam is essentially complete and excessive manipulation is avoided. Further objects will become apparent as this invention is more fully described.

I have found that the foregoing objects may be attained when I use a water immisicible organic solvent, such as, for example, the heptane isomers or perchlorethylene, as the crystallizing medium for the removal of impurities from crude caprolactam, and water to remove the caprolactam from the solvent after recrystallization. In carrying out the purification of crude caprolactam in accordance with this invention, the crude caprolactam is dissolved in a heated organic water-immiscible solvent, the solution is cooled to crystallize out the major proportion of the caprolactam, the cooled solution is separated from the crystallized caprolactam, water is added to the separated solution and agitated therewith, the mixture of water and organic solvent is stratified, and the water layer is removed. When a quantity of water equal by weight to at least one half the weight of the caprolactam in the organic solvent is used, up to 97% of the caprolactam will be in the water layer, but essentially all of the color-forming impurities will remain in the organic solvent layer. The aqueous solution of caprolactam can be returned to the crude still and recycled with fresh crude caprolactam. The applicability of this invention is illustrated by the following example.

Two hundred parts of crude caprolactam, brownish-yellow in color, was added to 400 parts of a mixture of heptane isomers and the mixture was heated to 65° C., at which temperature all of the caprolactam went into solution. The solution was cooled to 40° C. and filtered. The filter cake was washed with 50 parts of a fresh heptane solution and the wash liquid added to the filtrate. The filter cake, after drying, consisted of 180 parts of caprolactam, white in color.

A two hundred part portion of the filtrate was dried to remove the heptane solvent, and a dark amber residue of 9.6 parts was recovered. A second two hundred part portion of the filtrate was agitated with 10 parts of distilled water, the mixture allowed to stratify, and the water layer separated from the organic solvent layer. The water layer was light amber in color, weighed 18.6 parts, and was analyzed as being a 50% caprolactam solution. Evaporation of the organic solvent from the solvent layer left a dark brown viscous liquid of 0.5 part. Analysis failed to show any caprolactam in this residue.

The foregoing example clearly indicates the efficiency of the present method and its simplicity of operation. Additional experiments showed that the extraction of caprolactam from the organic solvent by water will be essentially complete provided the total quantity of water is such that at least one part of water is used for every two parts of caprolactam present. The extraction may be performed as a series of water washes or as a single operation as shown in the example. I prefer the singlepass procedure and to use at least one part of water per part of caprolactam to be extracted.

In the event solid caprolactam is present, such as that deposited on the cooling coils or walls of the crystallizer, or as fines which remained with the organic liquid, the amount of water must be adjusted to compensate for the additional amount of caprolactam. The aqueous layer should contain not more than 65% caprolactam by weight to insure good extraction from the organic solvent and good separation. To avoid extracting the impurity, the quantity of water used should not exceed four parts of water per part of lactam present.

The following example illustrates the applicability of the present invention to plant operation.

Crude lactam distillate from the crude still in the amount of 14,500 pounds was mixed (in a crystallizer equipped with heating and cooling coils) with 29,000 pounds of a mixture of heptane isomers and the mixture was heated to about 65° C. The caprolactam was entirely dissolved at this temperature. The solution was cooled to about 30° C. and filtered. The filter cake was washed with 1000 pounds of fresh heptane mixture and transferred to the finishing still. The heart cut was of excellent quality.

The filtrate was returned to the crystallizer and 3,570 pounds of water were added. After agitating for about fifteen minutes, the mixture was allowed to stratify. Separation of the layers was complete in less than five minutes, and the water layer was withdrawn. The weight of this layer was 4,960 pounds, by analysis, the caprolactam content was determined to be 1330 pounds. Based on the solubility of caprolactam in heptane at 30° C., 450 pounds of the caprolactam had been dissolved in the organic solvent, the remainder had been deposited on the cooling coils and the crystallizer walls or had passed through the filter as fines. The aqueous caprolactam was recycled to the crude still and combined with fresh aqueous caprolactam from the neutralizer for processing through the purification steps.

The organic solvent layer was sent to a rectification still and recovered. A residue of about 65 pounds of a dark oil remained and was purged.

The above example illustrates the additional advantage which can be gained by the method of the present invention, i. e., the elimination of the need for mechanically removing the crystallized caprolactam from the crystallizer coils and walls. The recycle of this caprolactam does not introduce any impurities into the system nor is there any yield loss resulting therefrom. However, the removal of the deposited crystallized caprolactam is not the essential feature of this invention, and would not be needed when the purification is performed by a continuous process instead of batchwise.

The extraction of the dissolved caprolactam from the organic solvent by water can be performed in a continuous process as well as in a batch process. In such process, water would be continuously introduced into the flow of filtrate from the separating unit and the mixture fed to a settling tank where stratification would occur. The water layer and the solvent layer would be continuously withdrawn at a predetermined rate and the water layer continuously fed to the crude still.

The recovery of the caprolactam from the aqueous solution need not be performed in the crude still nor need the recovery be performed simultaneously with the separation of fresh caprolactam. In certain processes, the use of a separate still to obtain the water-free caprolactam may be preferable. This is particularly true when a nonaqueous rearrangement medium is used.

The present invention has been fully described in the foregoing, and many modifications will be apparent to those skilled in the art. Accordingly, I intend to be limited only by the following claims.

I claim:

1. A process for the substantially quantitative recovery of caprolactam in relatively pure form which comprises dissolving crude caprolactam in a heated organic solvent immiscible with water, cooling said solution to crystallize out the major proportion of said caprolactam, separating said crystallized caprolactam from said organic solvent, agitating said organic solvent containing residual minor proportions of caprolactam with a quantity of water equal to from ½ to 4 parts of water per part of the caprolactam present, and separating the water phase from the organic solvent phase.

2. A process as claimed in claim 1, wherein the solvent comprises a mixture of heptane isomers.

3. A process as claimed in claim 1 wherein about 1 part of water per part of caprolactam present is used.

References Cited in the file of this patent

UNITED STATES PATENTS

| | | |
|---|---|---|
| 2,462,009 | Morris et al. | Feb. 15, 1949 |
| 2,692,878 | Kahr | Oct. 26, 1954 |
| 2,758,991 | Kretzers et al. | Aug. 14, 1956 |

FOREIGN PATENTS

| | | |
|---|---|---|
| 504,774 | Belgium | Aug. 14, 1951 |
| 583,947 | Great Britain | Jan. 3, 1947 |
| 666,717 | Great Britain | Mar. 1, 1949 |